(12) United States Patent
Shimotsu et al.

(10) Patent No.: US 7,653,275 B2
(45) Date of Patent: Jan. 26, 2010

(54) OPTICAL DEVICE HAVING CONNECTIONS WITH OPTICAL MEMBERS THROUGH PROTECTIVE MEDIUM

(75) Inventors: Shinichi Shimotsu, Kanagawa-ken (JP); Shinichiro Sonoda, Kanagawa-ken (JP); Hideo Miura, Kanagawa-ken (JP)

(73) Assignee: FUJIFILM Corporation (JP)

( * ) Notice: Subject to any disclaimer, the term of this patent is extended or adjusted under 35 U.S.C. 154(b) by 120 days.

(21) Appl. No.: 11/591,560

(22) Filed: Nov. 2, 2006

(65) Prior Publication Data

US 2007/0140617 A1 Jun. 21, 2007

(30) Foreign Application Priority Data

| Nov. 2, 2005 | (JP) | ............................... 2005-319226 |
| Mar. 29, 2006 | (JP) | ............................... 2006-090100 |
| Jun. 5, 2006 | (JP) | ............................... 2006-155613 |

(51) Int. Cl.
*G02B 6/00* (2006.01)
*G02B 6/24* (2006.01)
*G02B 6/26* (2006.01)

(52) U.S. Cl. ............................. 385/38; 385/15; 385/55; 385/58; 385/70; 385/73

(58) Field of Classification Search ............... 385/70–75
See application file for complete search history.

(56) References Cited

U.S. PATENT DOCUMENTS

| 4,812,016 A | * | 3/1989 | Miyata et al. ............... 359/580 |
| 5,157,461 A | * | 10/1992 | Page ........................... 356/462 |
| 5,308,656 A | * | 5/1994 | Emmons et al. .............. 427/282 |
| 5,930,421 A | | 7/1999 | Sakano |
| 6,203,208 B1 | * | 3/2001 | Stupar .......................... 385/73 |
| 6,393,182 B1 | * | 5/2002 | Sakano ......................... 385/38 |
| 6,424,765 B1 | * | 7/2002 | Harker ......................... 385/31 |
| 7,141,927 B2 | * | 11/2006 | Manning .................... 313/573 |
| 2003/0091304 A1 | * | 5/2003 | Tonai et al. ................... 385/93 |

FOREIGN PATENT DOCUMENTS

| CN | 167266 A | 12/1997 |
| CN | 1519603 A | 8/2004 |
| JP | 5-181040 A | 7/1993 |
| JP | 9-221342 A | 8/1997 |
| JP | 2004-279495 A | 10/2004 |

* cited by examiner

Primary Examiner—Michelle R Connelly Cushwa
(74) Attorney, Agent, or Firm—Sughrue Mion, PLLC

(57) ABSTRACT

An optical device includes: a first optical member having a light-exit end at which light exits the first optical member; a second optical member having a light-entrance end which abuts the light-exit end through a protective medium and from which the light enters the second optical member; and the protective medium which is arranged between the light-exit end and the light-entrance end, and suppresses fixing together of the light-exit end and the light-entrance end. Specifically, the protective medium is transparent and arranged between the light-exit end and the light-entrance end, and is reusable even after the light-exit end and the light-entrance end are pressed together with a pressure of approximately 0.5 or 1 kgf and are then separated from each other.

40 Claims, 7 Drawing Sheets

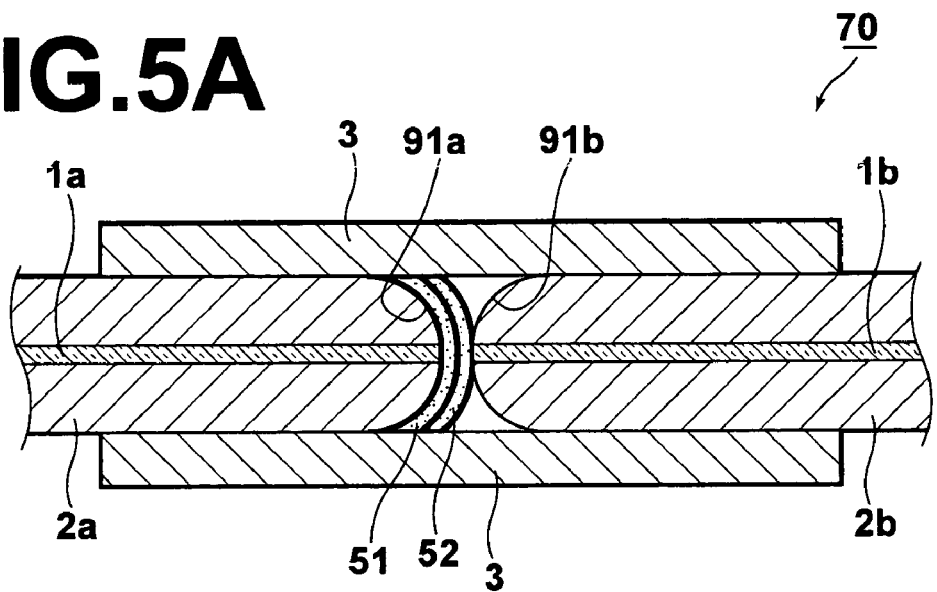
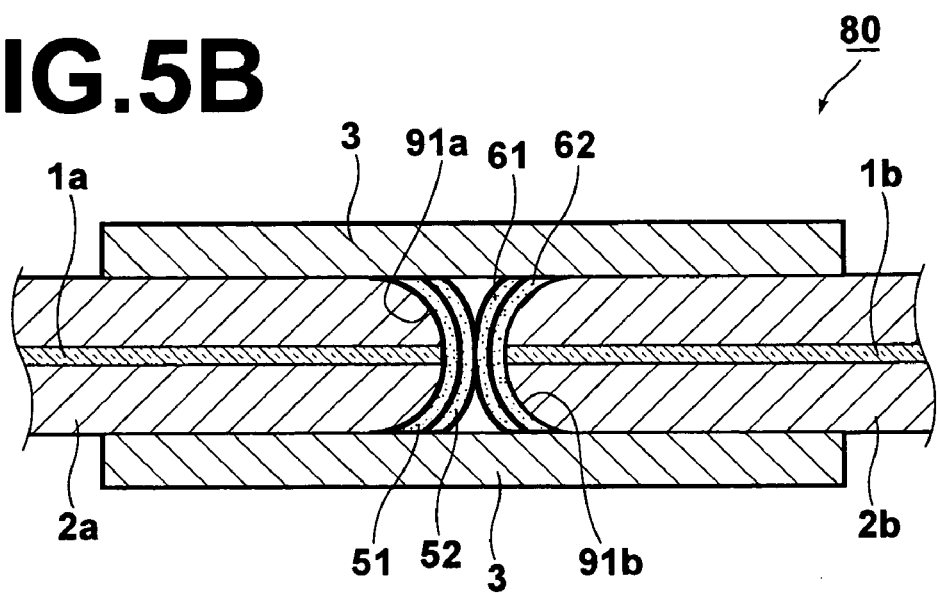

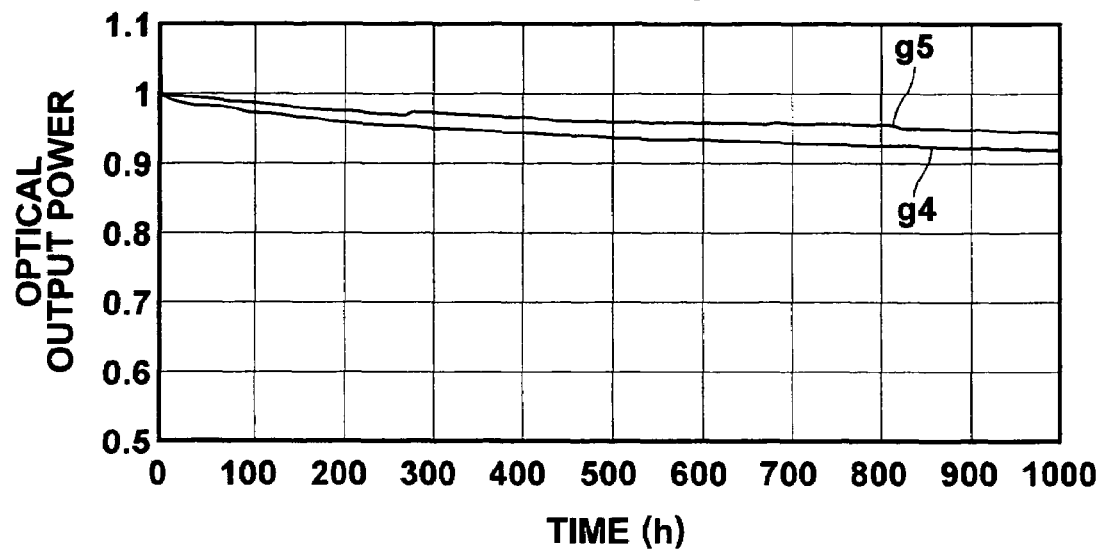
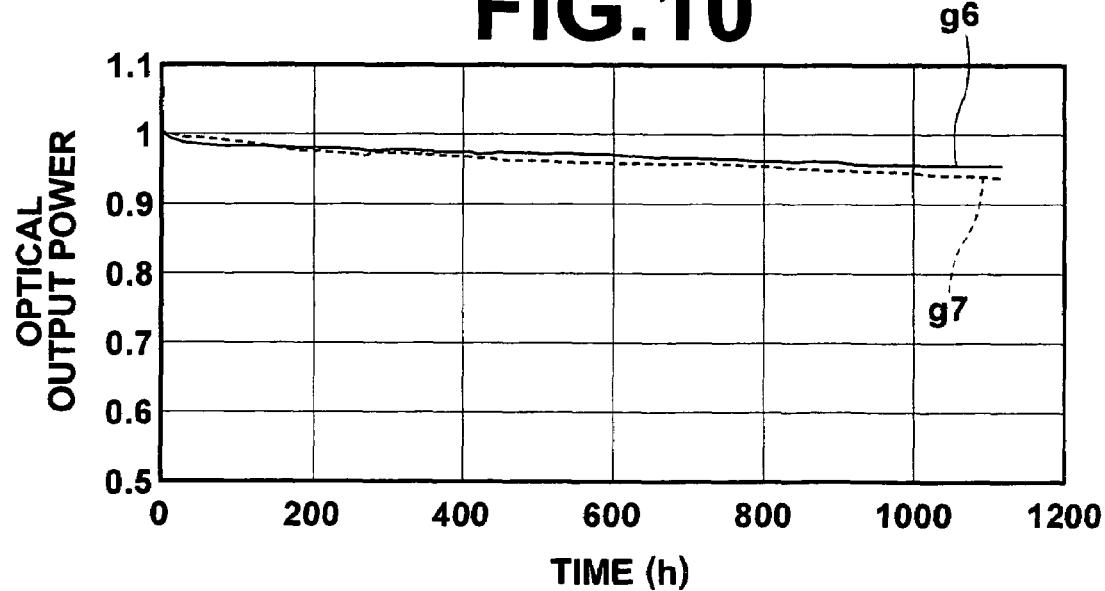

ered. When the end surfaces of the optical fibers are damaged, the optical loss becomes great even if the tip ends of the optical fibers 1a and 1b are arranged in contact again, so that desirable performance cannot be achieved, and the reliability of the optical device is lowered.

OPTICAL DEVICE HAVING CONNECTIONS WITH OPTICAL MEMBERS THROUGH PROTECTIVE MEDIUM

BACKGROUND OF THE INVENTION

1. Field of the Invention

The present invention relates to an optical device having optical members (such as light guides) which are held by a holding member (such as a sleeve) at the ends of the optical members, and also relates to an optical member (such as a light guide) which is used in combination with an external optical member.

2. Description of the Related Art

The optical contacting technique is a technique which is usually used for connecting tip ends of two optical fibers by making the end surfaces of the two optical fibers abut each other. According to the optical contacting technique, optical components such as optical fibers are joined by pressing the optical components together in such a manner that the optical components directly abut each other without interposition of another substance such as an adhesive between the optical components. Since the optical components directly abut each other in the optical contact, the optical contacting technique enables achievement of high optical propagation efficiency. FIG. 7 shows a cross section of a portion of a conventional optical device 100 in which an optical contact is used. As illustrated in FIG. 7, the optical fibers 1a and 1b are held by insertion of the optical fibers 1a and 1b into the ferrules 21 and 2b, and fixed by insertion of the near-tip portions of the ferrules 21 and 2b into the sleeve 3. The end of each of the ferrules 21 and 2b inserted in the sleeve 3 is polished into a predetermined shape (e.g., a hemispherical shape), so that the tip ends of the optical fibers 1a and 1b can be easily brought into contact, and a stable low-loss connection can be realized. Further, Japanese Unexamined Patent Publication Nos. 9(1997)-221342, 2004-279495, and 5(1993)-181040 disclose further information about stable optical contact between optical components.

However, when light having a wavelength in the short wavelength range propagates through the optical fibers 1a and 1b in the above optical device of FIG. 7, contamination with organic materials is likely to occur. Therefore, in order to prevent characteristic deterioration caused by the contamination, for example, the organic materials are removed by UV-cleaning the tip ends of the optical fibers 1a and 1b after polishing the tip ends of the optical fibers 1a and 1b.

Nevertheless, the present inventors have confirmed that when an optical contact is formed by removing the organic materials by UV (ultraviolet) cleaning and pressing together the tip ends of the optical fibers 1a and 1b, some reaction with oxides (such as $SiO_2$ or quartz) contained in the optical fibers 1a and 1b can occur at the abutting portions of the optical fibers 1a and 1b, and the abutting portions of the optical fibers 1a and 1b can be fixed together with the reaction products. Therefore, when the ferrules 21 and 2b are pulled out from the sleeve 3 after the above reaction, the abutting portions of the optical fibers 1a and 1b can be damaged.

In addition, even after the end surfaces of the optical fibers are UV cleaned, the organic materials cannot be completely removed. Therefore, when light having a wavelength in the short wavelength range propagates through the optical fibers 1a and 1b connected by an optical contact, and the organic materials remain at the abutting portions of the optical fibers, the organic materials at the abutting portions are decomposed by the light, and reaction with the oxides contained in the optical fibers 1a and 1b can occur, and cause damage to the abutting portions of the optical fibers. When the end surfaces of the optical fibers are damaged, the optical loss becomes great even if the tip ends of the optical fibers 1a and 1b are arranged in contact again, so that desirable performance cannot be achieved, and the reliability of the optical device is lowered.

SUMMARY OF THE INVENTION

The present invention has been developed in view of the above circumstances.

The first object of the present invention is to provide a highly reliable optical device which has optical members (such as optical fibers) abutting at ends of the optical members, and in which damage to the abutting ends is suppressed.

The second object of the present invention is to provide an optical member which is used in combination with an external optical member, and suppresses damage to an end of the optical member which is to abut the external optical member.

In order to accomplish the first object, an optical device according to the first aspect of the present invention is provided. The optical device according to the first aspect of the present invention comprises: a first optical member having a light-exit end at which light exits the first optical member; a second optical member having a light-entrance end which abuts the light-exit end through a protective medium and from which the light enters the second optical member; and the protective medium which is arranged between the light-exit end and the light-entrance end, and suppresses fixing together of the light-exit end and the light-entrance end.

In the optical device according to the first aspect of the present invention, the arrangement of the protective medium between the first and second optical members substantially prevents fixing together (for example, by adhesion or fusion) of the light-exit end and the light-entrance end caused by chemical reaction which can occur when the first and second optical members directly abut each other at normal temperature. When the light-exit end of the first optical member and the light-entrance end of the second optical member are arranged in contact through the protective medium, and reaction products are deposited at the abutting ends (the light-exit end and the light-entrance end) of the first and second optical members, and thereafter the first and second optical members are separated, unevenness is caused in the surfaces of the light-exit end and the light-entrance end. For example, the protective medium suppresses fixing together of the light-exit end and the light-entrance end to such a degree that the dimensions of the unevenness is at most half of the (oscillation) wavelength of the light, preferably one-fifth of the (oscillation) wavelength, and more preferably one-tenth of the (oscillation) wavelength.

In addition, in order to accomplish the first object, an optical device according to the second aspect of the present invention is also provided. The optical device according to the second aspect of the present invention comprises: a first optical member having a light-exit end at which light exits the first optical member; a second optical member having a light-entrance end which abuts the light-exit end through a protective medium and from which the light enters the second optical member; and the protective medium which is transparent, arranged between the light-exit end and the light-entrance end, and reusable even after the light-exit end and the light-entrance end are pressed together with a pressure of approximately 0.5 kgf and are then separated from each other.

In the optical device according to the second aspect of the present invention, the pressure may be approximately 1 kgf.

In the optical devices according to the first and second aspects of the present invention, the light-exit end of the first optical member and the light-entrance end of the second optical member may be connected by use of some connection means.

The optical devices according to the first and second aspects of the present invention have the following advantages.

In the case where light having a wavelength in the short wavelength range or light having high energy density propagates through optical members which directly abut each other in a holding member, chemical reaction with oxides (e.g., $SiO_2$ or quartz) contained in the optical members can occur, and the optical members can be fixed together at portions of the abutting ends of the optical members at which the above chemical reaction can occur, so that such portions can be damaged when the optical members are separated. When the abutting ends of the optical members are damaged, the organic members cannot be reused, or the optical loss becomes great even if the tip ends of the optical fibers $1a$ and $1b$ are arranged in contact again. In the optical devices according to the first and second aspects of the present invention, the protective medium is arranged between the light-exit end of the first optical member and the light-entrance end of the second optical member, and suppresses chemical reaction (particularly, the reaction with oxides contained in the first and second optical members which can occur if the first and second optical members are arranged in optical (direct) contact). Since the first and second optical members are not arranged in direct contact, the protective medium can prevent the reaction at the abutting ends, so that the optical devices according to the first and second aspects of the present invention can achieve stable performance.

Preferably, the optical devices according to the first and second aspects of the present invention may also have one or any possible combination of the following additional features (i) to (xx).

(i) The protective medium may be realized by a film formed on only one of the light-exit end and the light-entrance end.

(ii) In the optical devices according to the first and second aspects of the present invention having the feature (i), the film may be a multilayer film constituted by layers including a lowermost layer and an uppermost layer, where a first degree of adhesiveness between the uppermost layer and the other of the light-exit end and the light-entrance end is lower than a second degree of adhesiveness between adjacent ones of the layers, and a third degree of adhesiveness between the lowermost layer and the one of the light-exit end and the light-entrance end.

(iii) The protective medium may be realized by first and second films respectively formed on the light-exit end and the light-entrance end.

(iv) In the optical devices according to the first and second aspects of the present invention having the feature (iii), the first film may be a first multilayer film constituted by first layers including a lowermost layer and an uppermost layer, and the second film may be a second multilayer film constituted by second layers including a lowermost layer and an uppermost layer, where a first degree of adhesiveness between the uppermost layer of the first multilayer film and the uppermost layer of the second multilayer film is lower than a second degree of adhesiveness between adjacent ones of the first layers, a third degree of adhesiveness between adjacent ones of the second layers, a fourth degree of adhesiveness between the lowermost layer of the first multilayer film and the light-exit end, and a fifth degree of adhesiveness between the lowermost layer of the second multilayer film and the light-entrance end.

(v) In the optical devices according to the first and second aspects of the present invention having the feature (iii) or (iv), the first and second films may be respectively formed of different materials.

(vi) The total optical thickness of the protective medium in the propagation direction of the light may be equal to an integer multiple of half of the (oscillation) wavelength of the light.

The total optical thickness of the protective medium is defined as the sum of products of the values of the refractive index and the thickness (in the propagation direction) over the layers constituting the protective medium. For example, in the case where the protective medium is realized by the first and second films respectively formed on the light-exit end of the first optical member and the light-entrance end of the second optical member, and the first and second films have an identical refractive index, the product of the total thickness of the first and second films and the identical refractive index should be equal to an integer multiple of half of the (oscillation) wavelength of the light. On the other hand, in the case where the protective medium is realized by the first and second films respectively formed on the light-exit end of the first optical member and the light-entrance end of the second optical member, and the first and second films have different refractive indexes, the sum of the product of the thickness and the refractive index of the first film and the product of the thickness and the refractive index of the second film should be equal to an integer multiple of half of the (oscillation) wavelength of the light. (vii) The total optical thickness of the protective medium in the propagation direction of the light may be less than half of the (oscillation) wavelength of the light.

(viii) In the optical devices according to the first and second aspects of the present invention having the feature (vii), the protective medium preferably realizes propagation of the light from the first optical member to the second optical member with low loss. For example, the low loss may be defined as a condition in which the decrease in the optical power is less than 10% when light having the wavelength of 405 nm and the initial optical power of 200 mW (milliwatts) propagates through the first and second optical members and the protective medium in such a manner that the light passes through a region of the protective medium having a diameter of approximately 30 micrometers or smaller, where the decrease in the optical power is measured after propagation of the light for approximately 1,000 hours.

(ix) In the optical devices according to the first and second aspects of the present invention having the feature (viii), the protective medium may contain fluoride. In the case where the protective medium containing fluoride and having the total optical thickness less than half of the (oscillation) wavelength of the light is arranged between the first and second optical members, it is possible to suppress increase in the optical loss during propagation of the light for a long time, and improve the performance of the optical devices.

(x) In the optical devices according to the first and second aspects of the present invention having the feature (ix), the protective medium may be formed of fluoride, which may be one or more of $YF_3$, LiF, $MgF_2$, NaF, $LaF_3$, $BaF_2$, $CaF_2$, and $AlF_3$. Further, it is preferable that the protective medium exhibit low energy absorption.

(xi) In the optical devices according to the first and second aspects of the present invention having the feature (ii) or (iv), the uppermost layer of each multilayer film may contain fluoride.

(xii) In the optical devices according to the first and second aspects of the present invention having the feature (xi), the fluoride may be silicon-free.

(xiii) In the optical devices according to the first and second aspects of the present invention having the feature (xii), the uppermost layer may be formed of one or more of $YF_3$, LiF, $MgF_2$, NaF, $LaF_3$, $BaF_2$, $CaF_2$, and $AlF_3$.

(xiv) In the optical devices according to the first and second aspects of the present invention having the feature (xii), each of the layers other than the uppermost layer of each multilayer film may be realized by a silicon-free oxide film.

(xv) The light may have a wavelength belonging to a short wavelength range.

(xvi) In the optical devices according to the first and second aspects of the present invention having the feature (xv), the light may have a wavelength belonging to a wavelength range of 190 to 530 nm. When the wavelength of the light is equal to or shorter than 530 nm, the light can decompose organic materials, so that the present invention is more effective when the wavelength of the light is shorter. In addition, When the wavelength of the light is equal to or longer than 190 nm, the light can propagate through fluorine-doped $SiO_2$. Therefore, it is preferable that the light have a wavelength belonging to the wavelength range of 190 to 530 nm.

(xvii) At least one of the light-exit end and the light-entrance end may be UV cleaned.

(xviii) At least one of the first and second optical members may be a light guide. Further, the light guide may be an optical fiber.

In order to accomplish the aforementioned second object, an optical member according to the third aspect of the present invention is provided. The optical member according to the third aspect of the present invention comprises: an end which abuts an external optical member, and at which first light exiting the external optical member enters the optical member or second light exiting from the optical member enters the external optical member; and a protective medium which is arranged on the end, and suppresses fixing of the end to the external optical member. The optical member may be as light guide or an optical fiber.

DESCRIPTION OF THE DRAWINGS

FIG. 5A is a cross-sectional side view of a portion of an optical device according to a fifth embodiment of the present invention.

FIG. 5B is a cross-sectional side view of a portion of a variation of the optical device according to the fifth embodiment of the present invention.

FIG. 9 is a graph indicating the time variations of the optical output power in the optical devices in which $MgF_2$ films having a thickness of $\lambda/6$ are formed by evaporation and ion-assisted deposition, respectively.

FIG. 10 is a graph indicating the time variations of the optical output power in the optical devices in which $MgF_2$ films respectively having thicknesses of $\lambda/6$ and $\lambda/12$ are formed by ion-assisted deposition.

DESCRIPTION OF PREFERRED EMBODIMENTS

Figure 1A:
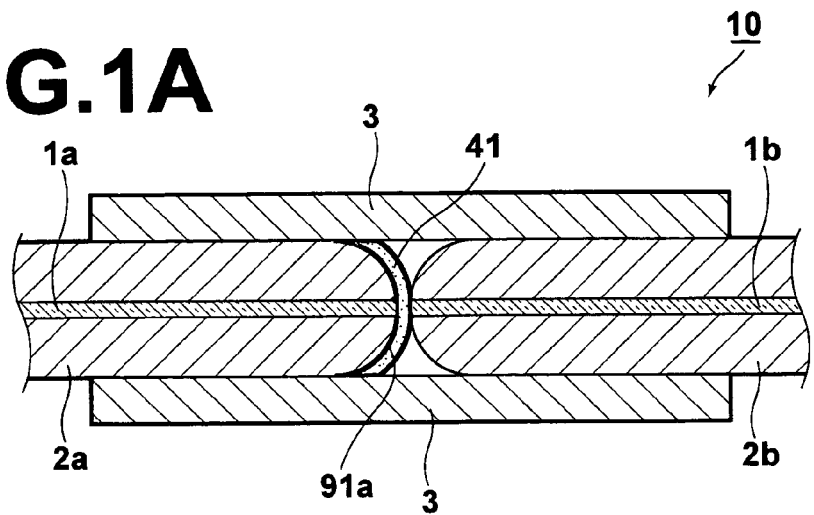
FIG. 1A is a cross-sectional side view of a portion of an optical device according to a first embodiment of the present invention.

Preferred embodiments of the present invention are explained in detail below with reference to drawings. In the drawings, equivalent elements and constituents are indicated by the same reference numbers even in drawings for different embodiments, and descriptions of the equivalent elements or constituents are not repeated in the following explanations unless necessary.

First Embodiment

The first embodiment of the present invention is explained below. FIG. 1A is a cross-sectional side view of a portion of an optical device 10 according to the first embodiment of the present invention. As illustrated in FIG. 1A, the optical device 10 comprises optical fibers 1a and 1b, ferrules 2a and 2b, a sleeve 3, and other parts (not shown). The optical fibers 1a and 1b correspond to the aforementioned first and second optical members, and have functions of light guides. The sleeve 3 is a holding member. A near-tip portion of the optical fiber 1a is inserted into the through-hole of the ferrule 2a, and a near-tip portion of the optical fiber 1b is inserted into the through-hole of the ferrule 2b. The tip-side ends of the ferrules 2a and 2b are polished into hemispherical shapes. (Alternatively, the tip-side ends of the ferrules 2a and 2b may be polished into planar shapes.) In addition, a film 41 is formed over the hemispherically shaped end surface of one of the ferrules 2a and 2b (for example, the hemispherically shaped end surface 91a of the ferrule 2a) so as to cover the tip end of the optical fiber inserted in the ferrule. The film 41 is formed of a material which is highly transparent to light having a wavelength in the short wavelength range (190 to 530 nm), and preferably contains fluoride (such as $YF_3$, LiF, $MgF_2$, NaF, $LaF_3$, $BaF_2$, $CaF_2$, and $AlF_3$) or the like. In this embodiment, the ferrules 2a and 2b have an outer diameter of 1.25 or 2.5 mm, and the hemispherically shaped end surfaces of the ferrules 2a and 2b have a radius of curvature of 7 to 25 mm.

After the formation of the film 41, the ferrules 2a and 2b are inserted into the sleeve 3 so that the tip end of the optical fiber 1b and the hemispherically shaped end surface of the optical fiber 2b abuts on the outer surface of the film 41. It is preferable that the ferrules 2a and 2b be pressed together with a pressure of 4.9 to 11.8 Pa.

Figure 7:
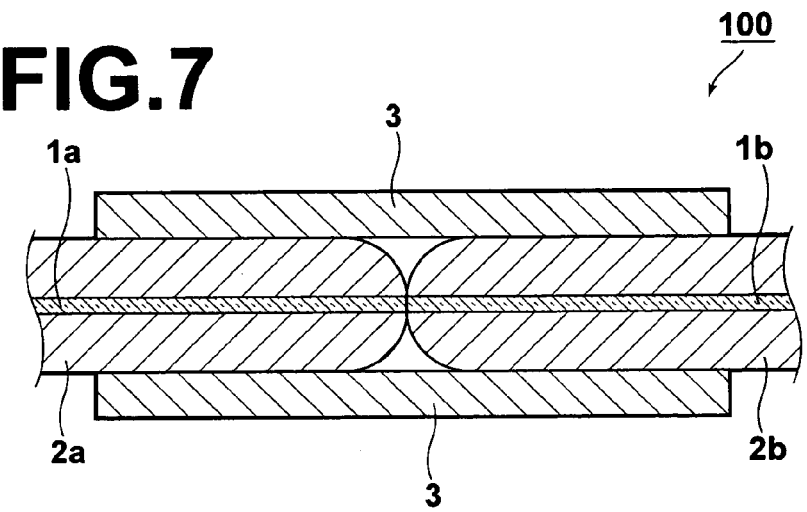
FIG. 7 is a cross-sectional side view of a portion of a conventional optical device.

As mentioned before, conventionally, optical fibers are connected by an optical contact. It is known that use of the optical contact increases the optical propagation efficiency in the case where the light propagating through the optical contact has a wavelength in the long wavelength range or the energy density of the light is not so high. However, in the case where the light propagating through the optical contact has a wavelength in the short wavelength range or the energy density of the light is high, reaction with oxides contained in the abutting portions of the optical fibers 1a and 1b can occur, so that the optical fibers 1a and 1b can be fixed together at the portions at which the reaction occurs. Therefore, if the ferrules 2a and 2b are pulled out of the sleeve 3 after the reaction occurs in the conventional optical device of FIG. 7, the portions of the optical fibers 1a and 1b at which the reaction occurs are damaged, so that the tip ends of the optical fibers 1a and 1b cannot be reused, or the optical loss becomes great even if the tip ends of the optical fibers 1a and 1b are arranged in contact again. Further, in the case where the light propagating through the optical contact has a wavelength in the short wavelength range, even if the UV cleaning is performed for preventing contamination of the tip ends of the optical fibers 1a and 1b with reaction products produced by reaction with organic materials (which is caused by the light propagating through the optical contact), the optical fibers 1a and 1b can be fixed together as mentioned before.

The present inventors have confirmed the above problem in the following manner.

Figure 6:
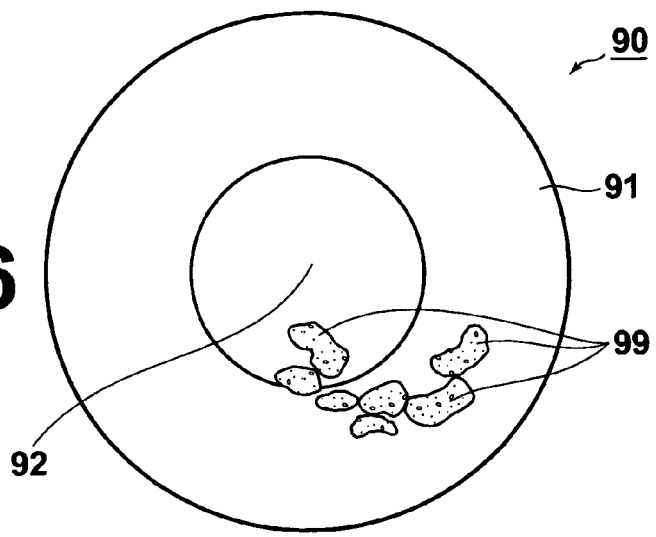
FIG. 6 is a view of an end surface of an optical fiber on which abutting portions are damaged.

FIG. 6 shows an end surface of an optical fiber after the end surface undergoes the following operations (1) to (4).

(1) The above end surface of the optical fiber and a surface of a piece of glass (not shown) are UV cleaned.

(2) The end surface of the optical fiber is brought into contact with the surface of the piece of glass.

(3) The end surface of the optical fiber is pressed against the surface of the piece of glass with a pressure of approximately 0.5 kgf for approximately 100 hours.

(4) The end surface of the optical fiber is separated from the surface of the piece of glass.

In FIG. 6, reference number 90 denotes the end surface of the optical fiber, 91 denotes a cladding, 92 denotes a core, and 99 denotes portions of the end surface at which reaction with oxides or quartz contained in the optical fiber and the piece of glass occurs, and the end surface is fixed to (adhered to or fused with) the surface of the piece of glass. That is, in the case where the above reaction occurs at portions of the end surface of the optical fiber, and the portions of the end surface are fixed to (adhered to or fused with) the surface of the piece of glass, the portions of the end surface are seriously damaged, or reaction products or fragments of the optical fiber or the glass are fixed to the end surface of the optical fiber or the surface of the piece of glass. Before the end surface of the optical fiber is brought into contact with the surface of the piece of glass (in the above operation (2)), the arithmetic average roughness (Ra) of the end surface of the optical fiber is 2 nm. The above phenomenon also occurs when optical fibers are brought into optical contact, and is more likely to occur when the arithmetic average roughness (Ra) of the end surfaces of the optical fibers is less than 5 nm, or when the propagated light has high energy density and a short wavelength.

As illustrated in FIG. 1A, in the case where the film 41 (which is highly transparent in the short wavelength range) is formed on the end surface of the ferrule 2a and the tip end of the optical fiber 1a inserted in the ferrule 2a, the optical fibers 1a and 1b are brought into contact through the film 41, and not into direct contact. Therefore, it is possible to prevent occurrence of reaction with oxides (such as quartz or $SiO_2$) at and damage to the abutting portions of the optical fibers 1a and 1b, so that the optical device 10 according to the first embodiment has stable performance.

The film 41 is a film which suppresses chemical reaction between the abutting portions of the optical fibers 1a and 1b at normal temperature. Specifically, the film 41 can be realized by a film containing fluoride (such as LiF, $BaF_2$, $MgF_2$, and $CaF_2$) or the like.

Preferably, the film 41 is such a film that even after the optical fibers 1a and 1b are pressed together through the film 41 with a pressure of 0.05 kgf to 0.5 kgf (preferably, 0.05 kgf to 1 kgf) and are then separated, damage to the film 41 and the optical fibers 1a and 1b is minimized so that the optical fibers 1a and 1b are reusable. In this case, when the optical fibers 1a and 1b are connected by inserting the optical fibers 1a and 1b in the ferrules 2a and 2b, inserting the ferrules 2a and 2b in the sleeve 3, and pressing together the ends of the optical fibers 1a and 1b with the above pressure of 0.05 kgf to 0.5 kgf (preferably, 0.05 kgf to 1 kgf), damage to the abutting portions of the optical fibers 1a and 1b can be substantially prevented.

Figure 3A:
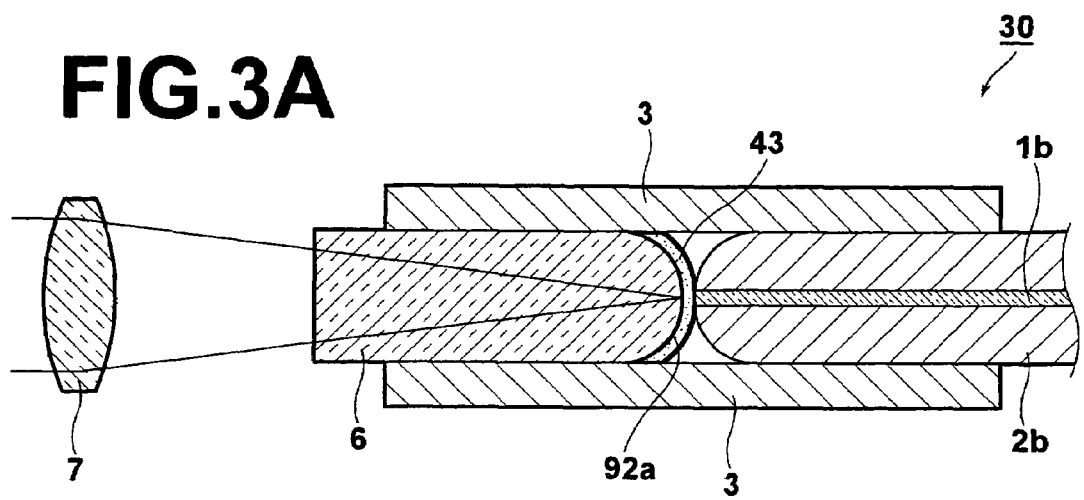
FIG. 3A is a cross-sectional side view of a portion of an optical device according to a third embodiment of the present invention.

The film 41 may be either a monolayer film or a multilayer film. In the case of the multilayer film, it is preferable that the uppermost layer of the multilayer film be resistant to reaction with quartz or $SiO_2$ contained in the optical fibers 1a and 1b. In addition, the film 41 may be directly formed on the end surface 91a of the ferrule 2a, or be formed after an assistive film is formed on the end surface 91a. Note that in FIGS. 1A and 1B, the end surfaces of the ferrule 2a and the ferrule 2b at the ends which are inserted into the sleeve 3 are processed to be hemispheric in shape. Alternatively, only one of the two end surfaces may be processed to be hemispheric in shape while the other is ground to be a flat surface, as illustrated in FIG. 3C. As a further alternative, both end surfaces may be ground to be flat surfaces.

The film 41 is arranged to have such a thickness as not to affect the optical loss. For example, since the optical fibers 1a and 1b and the film 41 have different refractive indexes, it is preferable that the thickness d1 of the film 41 in the propagation direction of the light satisfy the equation, $$d1 \times N = (\lambda/2) \times n, \tag{1}$$

where N is the refractive index of the film 41, λ is the (oscillation) wavelength of the light, and n is an integer greater than zero.

Figure 1B:
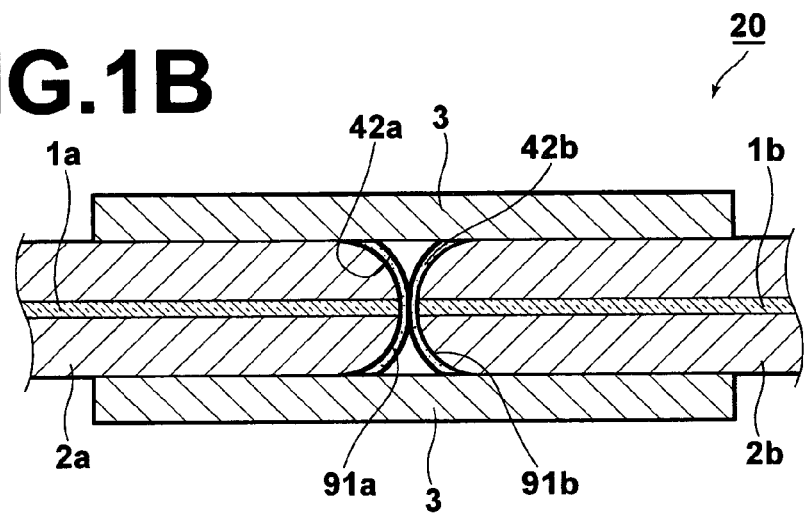
FIG. 1B is a cross-sectional side view of a portion of a variation of the optical device according to the first embodiment of the present invention.

Alternatively, it is possible to form a film on each of the end surfaces of the ferrules 2a and 2b. FIG. 1B is a cross-sectional side view of a portion of a variation 20 of the optical device according to the first embodiment of the present invention. In the optical device 20 illustrated in FIG. 1B, a film 42a is formed on the end surface 91a of the ferrule 2a in which the optical fiber 1a is inserted, a film 42b is formed on the end surface 91b of the ferrule 2b in which the optical fiber 1b is inserted, and the tip-end portions of the ferrules 2a and 2b are inserted into the sleeve 3 so that the ferrules 2a and 2b are brought into contact through the films 42a and 42b. In order to prevent reaction at or fixing together of the abutting portions of the films 42a and 42b, it is preferable that the uppermost layers of the films 42a and 42b be formed of different materials which are resistant to reaction with each other. In addition, it is also preferable that the sum of the thicknesses of the films 42a and 42b satisfy the equation (1). In the case where the films 42a and 42b have an identical thickness d2 and an identical refractive index N, it is preferable that the thickness d2 and the refractive index N satisfy the equation, $$d2 \times N = (\lambda/4) \times n, \quad (2)$$

where $\lambda$ is the (oscillation) wavelength of the light, and n is an integer greater than zero.

On the other hand, in the case where the films 42a and 42b have different thicknesses d2a and d2b, and are formed of different materials having different refractive indexes Na and Nb, it is preferable that the thicknesses d2a and d2b and the refractive indexes Na and Nb satisfy the equation, $$(d2a \times Na) + (d2b \times Nb) = (\lambda/2) \times n, \quad (3)$$

where $\lambda$ is the (oscillation) wavelength of the light, and n is an integer greater than zero.

Preferable Conditions

The present inventors have investigated and confirmed other preferable conditions for improving the performance of the optical device as indicated below.

Figure 8:
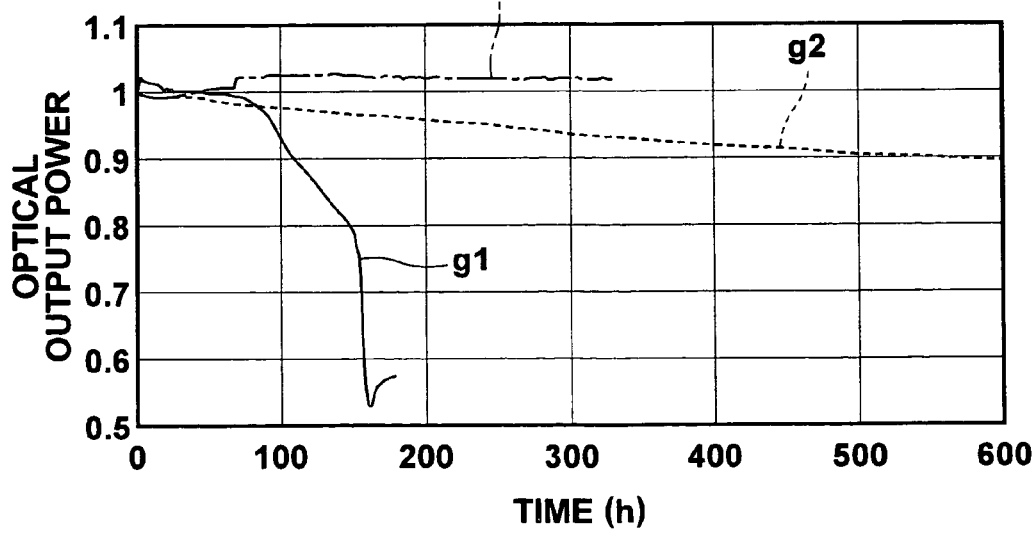
FIG. 8 is a graph indicating the time variations of the optical output power in the optical devices in which $MgF_2$ films respectively having thicknesses of $\lambda/2$, $\lambda/4$ and $\lambda/6$ are formed by evaporation.

(1) The present inventors have confirmed that when each film formed on one of the end surfaces is a fluoride film having a thickness less than half of the (oscillation) wavelength of the light, aging of the film and increase in the optical loss can be suppressed, although the increase in the optical loss can occur when the film is exposed to light for a long time. The present inventors have prepared three types of samples of the optical device 10 in which the films of $MgF_2$ respectively having thicknesses of $\lambda/2$, $\lambda/4$, and $\lambda/6$ are formed on the end surfaces 91a as the film 41. Then, laser light having a wavelength of 405 nm and optical power of 160 mW has been injected into the optical fiber 1a in such a manner that the laser light passes through a region of the film 41 having a diameter of approximately 30 micrometers or smaller, and the time variations of the optical output power (i.e., the optical power of light which exits from the optical fiber 1b) have been measured. The result of the measurement is indicated in FIG. 8. In FIG. 8, the solid curve g1, the dashed curve g2, and the dash-dot curve g3 respectively indicate the optical output power in the samples in which the thicknesses of the films 41 are $\lambda/2$, $\lambda/4$, and $\lambda/6$, and the optical output power is indicated by the ratio of the measured optical output power to the optical power of the laser light injected into the optical fiber 1a. The decrease in the optical output power corresponds to increase in the optical loss.

As indicated in FIG. 8, when the thickness of the film 41 is smaller, the decrease in the optical output power (i.e., the optical loss) becomes smaller. Further, the present inventors have observed the film 41 in each sample after the above measurement, by using a microscope. According to the observation, while no change is observed in the appearance of the film 41 having the thickness of $\lambda/6$, color changes are observed in the regions of the film 41 having the thicknesses of $\lambda/4$ and $\lambda/2$ through which the laser light is deemed to have passed. It is considered that the heat generated by the laser light partially fuses the film 41 having the thicknesses of $\lambda/4$ and $\lambda/2$, and causes the color changes observed in the film 41. It is considered that when the thickness of the film 41 is greater, a greater portion of the energy of the laser light is absorbed by the film 41, so that the greater energy absorption changes the quality of the film 41, and increases the optical loss.

(2) In addition, the present inventors have also confirmed, on the basis of the following measurement, that the optical loss can be more effectively decreased in films formed by ion-assisted deposition than in films formed by evaporation.

That is, the present inventors have prepared two types of samples of the optical device 10 in which films of $MgF_2$ having a thickness of $\lambda/6$ are formed as the film 41 on the end surfaces 91a by evaporation and ion-assisted deposition, respectively. Then, laser light having a wavelength of 405 nm and optical power of 160 mW has been injected into the optical fiber 1a, and the time variations of the optical output power (i.e., the optical power of light which exits from the optical fiber 1b) have been measured. The result of the measurement is indicated in FIG. 9. In FIG. 9, the curves g4 and g5 indicate the optical output power in the samples in which the films 41 are formed by evaporation and ion-assisted deposition, respectively.

As indicated in FIG. 9, the decrease in the optical power of the laser light which passes through the film 41 formed by ion-assisted deposition is smaller than the decrease in the optical power of the laser light which passes through the film 41 formed by evaporation. Since the decrease rate of the curve g5 is greater than the decrease rate of the curve g4, it is possible to expect that the difference in the optical output power between the samples of the optical device 10 in which the films 41 are formed by evaporation and ion-assisted deposition will further increase when the films 41 are exposed to the laser light for more than 1,000 hours. It is considered that the optical loss can be more suppressed in the optical device in which the film 41 is formed by ion-assisted deposition than in the optical device in which the films 41 are formed by evaporation, for the following reasons. First, the target (i.e., the tip end of the optical fiber 1a) in the ion-assisted deposition can be cleaned by ion beams and the like before formation of the film 41, so that the loss at the boundary between the target and the film 41 can be decreased. Second, the ion-assisted deposition can form a denser film than the evaporation. Therefore, it is possible to consider that the variations in the film quality caused by absorption of a portion of the energy of the laser light are smaller in the film formed by ion-assisted deposition than in the film formed by evaporation. In addition, even when the ion plating, sputtering, or the like is used instead of the ion-assisted deposition, it is also possible to form a film denser than the film formed by evaporation, and clean the target before the film formation.

(3) Further, the present inventors have prepared two types of samples of the optical device 10 in which the films of $MgF_2$ respectively having thicknesses of $\lambda/6$ and $\lambda/12$ are formed on the end surfaces 91a as the film 41. Then, laser light having a wavelength of 405 nm and optical power of 160 mW has been injected into the optical fiber 1a, and the time variations of the optical output power (i.e., the optical power of light which exits from the optical fiber 1b) have been measured. The result of the measurement is indicated in FIG. 10. In FIG. 10, the curve g6 and the dash-dot curve g7 respectively indicate the optical output power in the samples in which the thicknesses of the films 41 are $\lambda/6$ and $\lambda/12$.

As indicated in FIG. 10, the optical output power varies with time similarly in both the samples in which the thicknesses of the films 41 are $\lambda/6$ and $\lambda/12$. That is, it is possible to consider that the time variations of the optical output power in the optical devices are similar in the case where the laser light having a wavelength of 405 nm and optical power of 160 mW propagates through the film 41 and the optical fibers 1a and 1b, and the thickness of the film 41 does not exceed $\lambda/6$.

Figure 11:
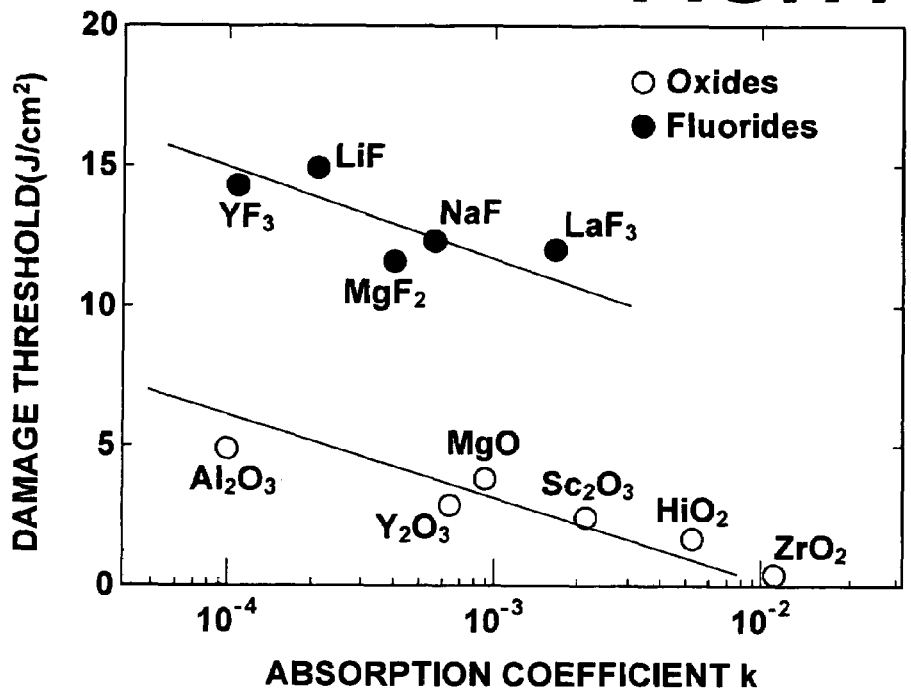
FIG. 11 is a graph indicating a relationship between the absorption coefficient and the damage threshold of a film in the optical device in which the film is exposed to pulsed laser having the oscillation wavelength of 248 nm.
Figure 12:
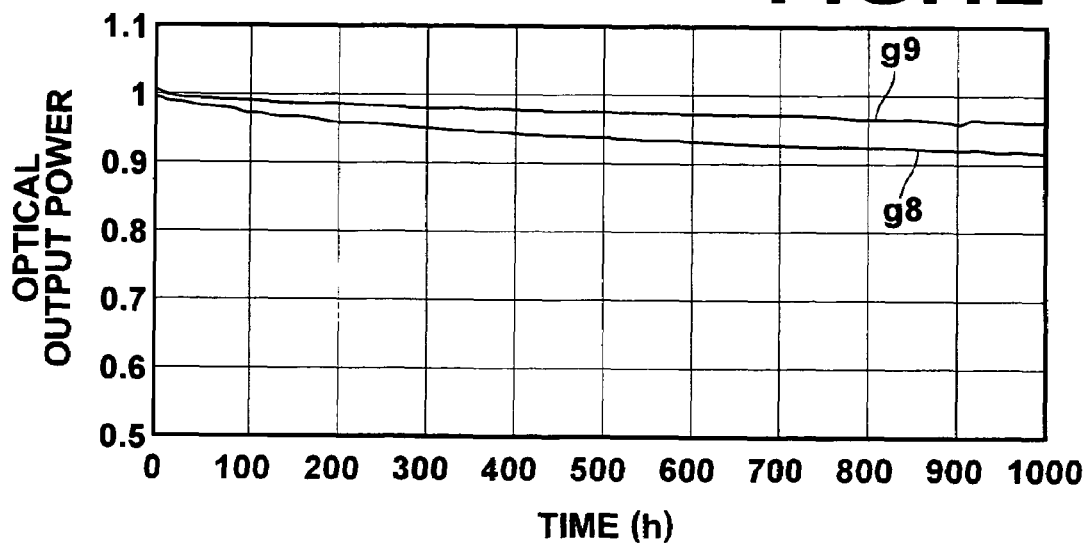
FIG. 12 is a graph indicating the time variations of the optical output power in the optical devices in which $MgF_2$ and $YF_3$ films having a thickness of $\lambda/6$ are formed by evaporation, respectively.

(4) Furthermore, the present inventors have also confirmed that the optical loss in the film 41 formed of a material having a lower absorption coefficient can be more effectively decreased. FIG. 11 is a graph indicating a relationship between the absorption coefficient and the damage threshold of a film in the case where the film is exposed to pulsed laser having the oscillation wavelength of 248 nm. The graph of FIG. 11 is quoted from J. Dijon et al., "High damage threshold fluoride UV mirrors made by ion beam sputtering," SPIE, vol. 3244, pp. 406-418, 1998 and shows that the damage thresholds of the fluoride films are high, and the $YF_3$ films and the LiF films have higher damage thresholds than the $MgF_2$ films. Therefore, the present inventors have prepared two types of samples of the optical device 10 in each of which the film 41 having a thickness of $\lambda/6$ is formed on the end surfaces 91a by evaporation, where the film 41 is formed of $MgF_2$ in the first type of samples, and $YF_3$ in the second type of samples. Then, laser light having a wavelength of 405 nm and optical power of 160 mW has been injected into the optical fiber 1a, and the time variations of the optical output power (i.e., the optical power of light which exits from the optical fiber 1b) have been measured. The result of the measurement is indicated in FIG. 12. In FIG. 12, the curves g8 and g9 indicate the optical output power in the samples in which the films 41 are formed of $MgF_2$ and $YF_3$, respectively.

As indicated in FIG. 12, the decrease in the optical power of the laser light which passes through the film 41 formed of $YF_3$ is smaller than the decrease in the optical power of the laser light which passes through the film 41 formed of $MgF_2$. Since the decrease rate of the curve g9 is smaller than the decrease rate of the curve g8, it is possible to expect that the difference in the optical output power between the samples of the optical device 10 in which the films 41 are respectively formed of $MgF_2$ and $YF_3$ will further increase when the laser light propagates through the film 41 and the optical fibers 1a and 1b for more than 1,000 hours. Therefore, in order to reduce the optical loss, the film or films realizing the protective medium are preferably fluoride films (e.g., films of one or more of $YF_3$, LiF, $MgF_2$, NaF, $LaF_3$, $BaF_2$, $CaF_2$, and $AlF_3$), and more preferably $YF_3$ films or the like which have small absorption coefficients.

As described above, in order to suppress the ratio of the optical output power to the optical input power below 10% after the laser light having a wavelength of 405 nm and optical power of 160 mW propagates through the film 41 and the optical fibers 1a and 1b for 1,000 hours, it is preferable that the thickness of the film formed over the tip end of the optical fiber 1a be equal to or less than $\lambda/6$. In addition, it is preferable to form the film 41 by using a technique which can form a dense film and clean the target before the film formation (such as the ion-assisted deposition, the ion plating, or the sputtering). Further, it is preferable that the portion of the energy of the laser light absorbed in the film 41 be small.

UV Cleaning

In the case where the wavelength of the light propagating through the optical device 10 illustrated in FIG. 1A belongs to the short wavelength range of 190 to 530 nm, in order to prevent contamination with organic materials, it is possible to UV clean the areas of the end surfaces of the ferrules 2a and 2b which are not covered with the film 41. Since the film 41 containing the aforementioned fluoride (e.g., one or more of $YF_3$, LiF, $MgF_2$, NaF, $LaF_3$, $BaF_2$, $CaF_2$, and $AlF_3$), which is not activated by light in the ultraviolet wavelength range (of 190 to 410 nm), is formed on the ferrule 2a, it is possible to prevent occurrence of reaction with oxides (such as quartz or $SiO_2$) at the abutting portions of the optical fibers 1a and 1b, and suppress occurrence of damage to the abutting portions.

In addition, in the case where the end surfaces 91a and 91b of the ferrules 2a and 2b are UV cleaned in the optical device 20 of FIG. 1B in order to prevent contamination with organic materials, it is also possible to suppress chemical reaction at the abutting portions of the optical fibers 1a and 1b.

Second Embodiment

Figure 2:
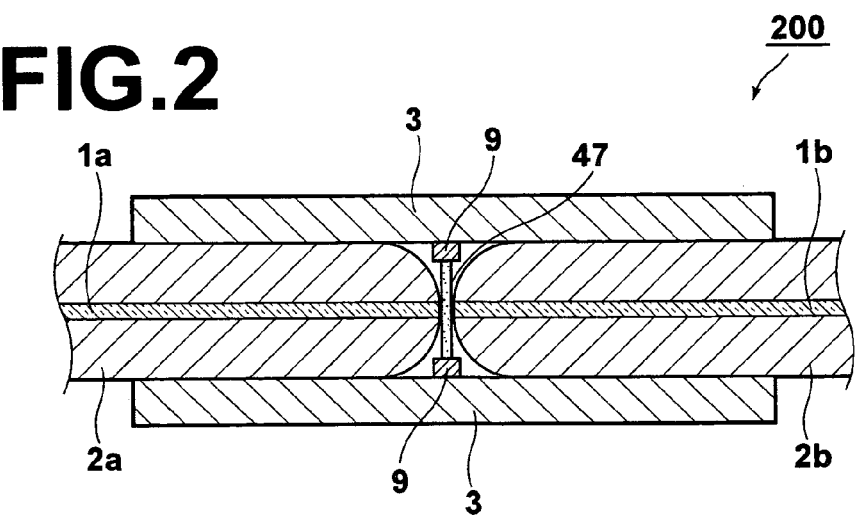
FIG. 2 is a cross-sectional side view of a portion of an optical device according to a second embodiment of the present invention.

Although the protective medium in the optical device 10 illustrated in FIG. 1A is realized by the thin film 41 formed on the end surface 91a of the ferrule 2a, the protective medium may not be limited to the thin film 41 formed on the end surface of the ferrule 2a, and it is sufficient to arrange a protective medium so that the ferrules 2a and 2b do not come into direct contact. For example, the optical device according to the present invention can be realized by the optical device 200 illustrated in FIG. 2, which is a cross-sectional side view of a portion of an optical device 200 according to the second embodiment of the present invention. In the optical device 200, a protective medium 47 is arranged in the sleeve 3. Specifically, a circular flange 9 holding the protective medium 47 is arranged inside the sleeve 3 so that the optical fibers 1a and 1b come into contact through the protective medium 47 even when the ferrules 2a and 2b are inserted into the sleeve 3 from both ends of the sleeve 3. The protective medium 47 is formed of a material which is highly transparent in the short wavelength range, for example, teflon. (Teflon is a registered trademark of E.I. du Pont de Nemours and Company.)

Third Embodiment

The third embodiment of the present invention is explained below. FIG. 3A is a cross-sectional side view of a portion of an optical device 30 according to the third embodiment of the present invention. As illustrated in FIG. 3A, according to the third embodiment, a transparent member 6, instead of the ferrule 2a holding the optical fiber 1a, is inserted into and fixed to the sleeve 3 so that the end surface 92a of the transparent member 6 is arranged in optical contact with the tip end of the optical fiber 1b (held in the ferrule 2b) through a film 43. The transparent member 6 is made of glass or the like, and no optical waveguide is formed in the transparent member 6. In the optical device 30 of FIG. 3A, light incident on the lens 7 enters the transparent member 6 from the light-entrance end of the transparent member 6, and is focused at the end surface 92a of the transparent member 6. Then, the light passes through the film 43 and enters the optical fiber 1b from the tip end of the optical fiber 1b. The film 43 may be either a monolayer film or a multilayer film, and the thickness of the film 43 and the material of which the film 43 is formed are similar to the first embodiment. The optical device 30 of FIG. 3A has similar advantages to the first embodiment.

Figure 3B:
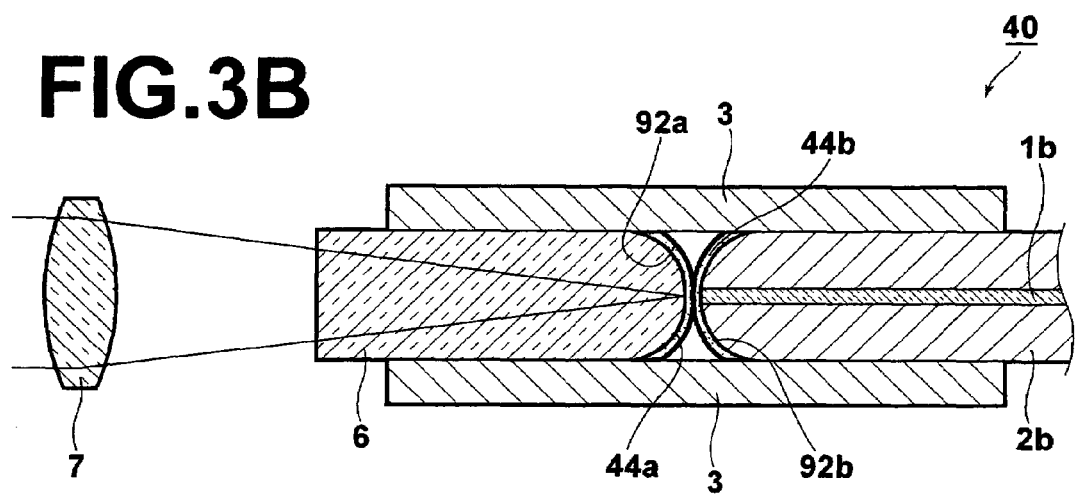
FIG. 3B is a cross-sectional side view of a portion of a variation of the optical device according to the third embodiment of the present invention.
Figure 3C:
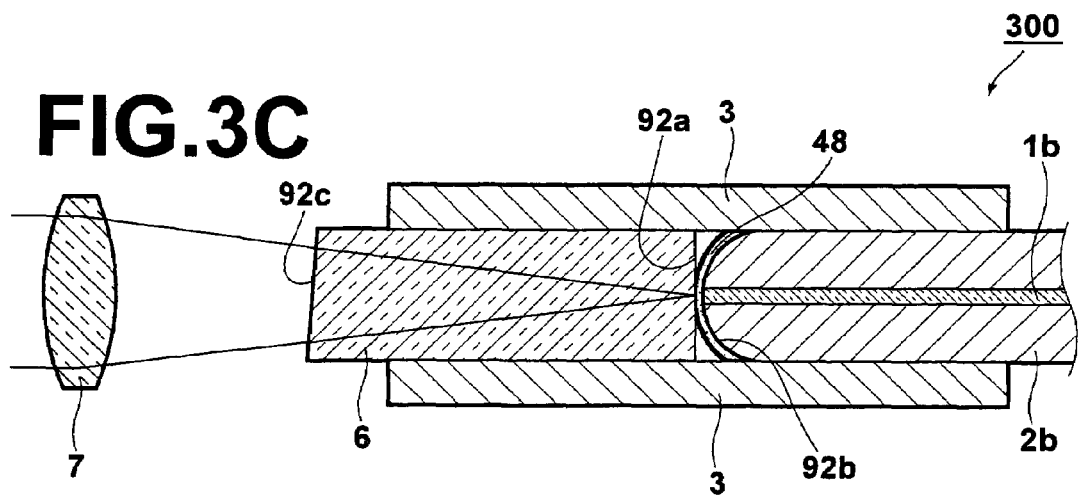
FIG. 3C is a cross sectional side view of a portion of another variation of the optical device according to the third embodiment of the present invention.

Alternatively, it is possible to form films 44a and 44b on the end surface 92a of the transparent member 6 and the end surface 92b of the ferrule 2b, respectively, as illustrated in FIG. 3B, which is a cross-sectional side view of a portion of a variation 40 of the optical device according to the third embodiment of the present invention. Further, the end surface 92a of the transparent member 6 may be ground to be a flat surface, and a film 48 may be provided on the end surface 92b of the ferrule 2b, which is processed to be hemispheric in shape, as in the optical device 300 illustrated in FIG. 3C. In this case, it is preferable for the end surface 92c of the transparent member 6 to be inclined 3-4 degrees from a plane perpendicular to the axis thereof. In the case that the inclination is provided, the amount of light reflected toward the lens 7 is reduced, and efficient light guiding becomes possible.

As indicated above, it is possible to achieve similar advantages to the first embodiment by forming an optical device in which an optical member (made of glass or the like) other than the light guide such as the optical fiber is arranged in optical contact with a light guide through the above film or films. Further, it is also possible to achieve similar advantages to the first embodiment by forming an optical device in which two optical members (made of glass or the like) other than the light guide such as the optical fiber are arranged in optical contact through the above film or films. In these cases, the film 43 (or each of the films 44a and 44b) may be either a monolayer film or a multilayer film, and the thickness of the film 43 (or each of the films 44a and 44b) and the material by which the film 43 (or each of the films 44a and 44b) is formed are similar to the first embodiment.

Fourth Embodiment

Figure 4A:
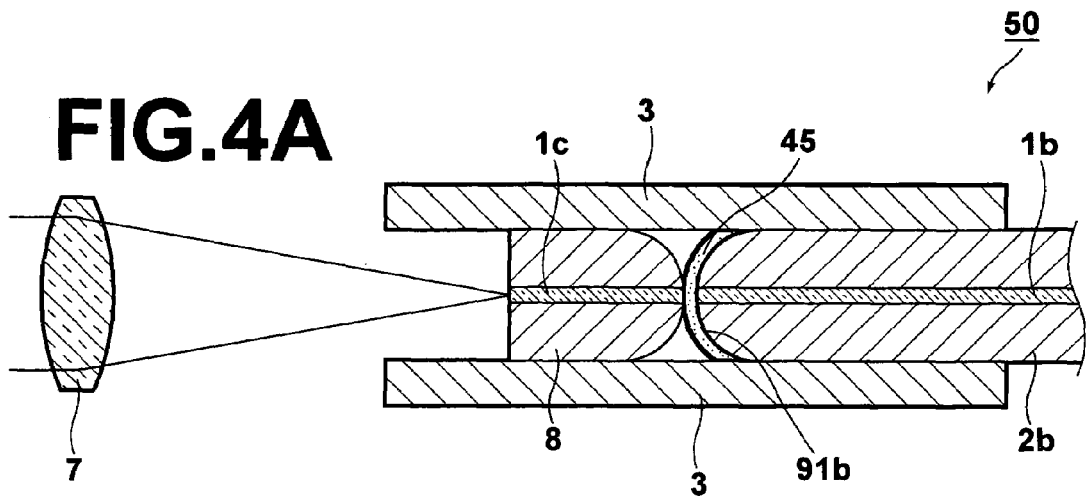
FIG. 4A is a cross-sectional side view of a portion of an optical device according to a fourth embodiment of the present invention.

The fourth embodiment of the present invention is explained below. FIG. 4A is a cross-sectional side view of a portion of an optical device 50 according to the fourth embodiment of the present invention. As illustrated in FIG. 4A, according to the fourth embodiment, a fiber stub 8 into which an optical fiber 1c is inserted is inserted into and fixed to the sleeve 3 so that a tip end of the optical fiber 1c (inserted into the fiber stub 8) is arranged in optical contact through a film 45 with the tip end of the optical fiber 1b (inserted into the ferrule 2b). The fiber stub 8 has a through-hole into which the optical fiber 1c is inserted, and the film 45 is formed on the end surface 91b of the ferrule 2b, into which the optical fiber 1b is inserted. In the optical device 50 of FIG. 4A, light incident on the lens 7 is focused at the light-entrance end of the optical fiber 1c (inserted in the fiber stub 8), and enters the optical fiber 1c. Then, the light passes through the film 45 and enters the optical fiber 1b from the tip end of the optical fiber 1b. Alternatively, the film 45 may be formed on the end surface 93b of the fiber stub 8 instead of the end surface 91b of the ferrule 2b.

Figure 4B:
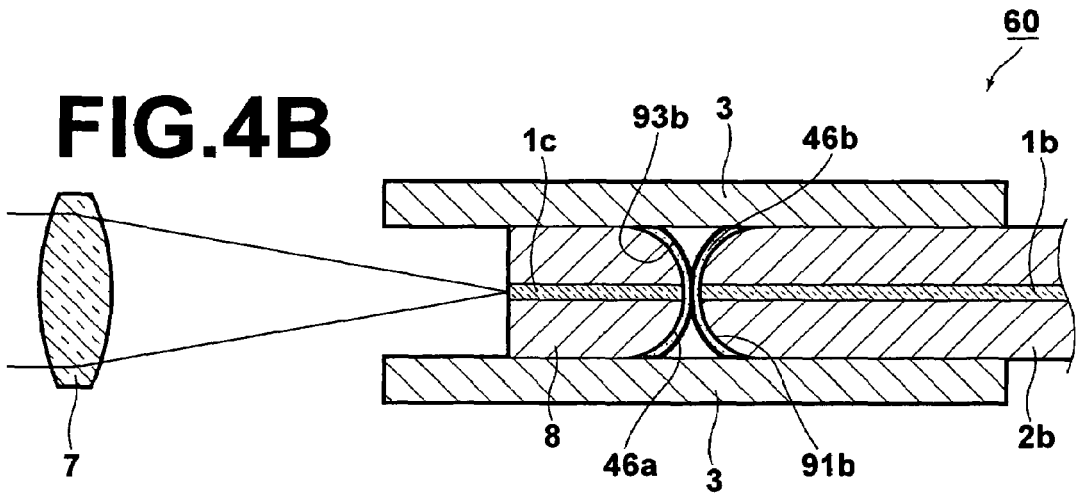
FIG. 4B is a cross-sectional side view of a portion of a variation of the optical device according to the fourth embodiment of the present invention.

Further alternatively, it is possible to form films 46a and 46b on the end surface 93b of the fiber stub 8 and the end surface 91b of the ferrule 2b, respectively, as illustrated in FIG. 4B, which is a cross-sectional side view of a portion of a variation 60 of the optical device according to the fourth embodiment of the present invention. Note that in FIGS. 4A and 4B, the end surfaces of the fiber stub 8 and the ferrule 2b at the ends which are inserted into the sleeve 3 are processed to be hemispheric in shape. Alternatively, only one of the two end surfaces may be processed to be hemispheric in shape while the other is ground to be a flat surface, as illustrated in FIG. 3C. As a further alternative, both end surfaces may be ground to be flat surfaces.

Fifth Embodiment

The fifth embodiment of the present invention is explained below. The optical devices according to the fifth embodiment is different from the first embodiment in that a multilayer film constituted by two or more layers is formed on the end surface of one or each of the ferrules 2a and 2b.

FIG. 5A is a cross-sectional side view of a portion of an optical device 70 according to the fifth embodiment of the present invention. In the optical device 70 illustrated in FIG. 5A, two films 51 and 52 are formed on the end surface 91a of the ferrule 2a in this order, where the optical fiber 1a is inserted into the ferrule 2a, and the degree of adhesiveness between the films 51 and 52 and the degree of adhesiveness between the film 51 and the end surface 91a of the ferrule 2a are higher than the degree of adhesiveness between the film 52 and the end surface 91b of the ferrule 2b. If the degree of adhesiveness between the film 52 and the end surface 91b of the ferrule 2b is high, a portion of the film 52 which abuts the end surface 91b can come off and adhere to the end surface 91b of the ferrule 2b when the ferrules 2a and 2b are separated after the ferrules 2a and 2b are inserted into the sleeve 3 so that the film 52 and the end surface 91b of the ferrule 2b are brought into contact. In this case, the film 52 is damaged, and the optical device 70 cannot be reused. On the other hand, in the optical device 70 according to the fifth embodiment, the degree of adhesiveness between the film 52 and the end surface 91b of the ferrule 2b is lower than the degree of adhesiveness between the films 51 and 52 and the degree of adhesiveness between the film 51 and the end surface 91a of the ferrule 2a. Therefore, it is possible to prevent the separation of the film 52 and the damage to the abutting portions of the film 52 and the end surface 91b, so that the optical device 70 becomes stable.

In the optical device 70, the multilayer film formed on the end surface 91a of the ferrule 2a is constituted by two layers of the films 51 and 52. However, the multilayer film may be constituted by more than two layers. In such cases, it is preferable that the degree of adhesiveness between the uppermost layer of the multilayer film and the end surface 91b of the ferrule 2b is lower than the degree of adhesiveness between adjacent ones of the layers constituting the multilayer film and the degree of adhesiveness between the lowermost layer of the multilayer film and the end surface 91a of the ferrule 2a. In addition, it is also preferable that the uppermost layer of the multilayer film (e.g., the film 52) is formed of silicon-free fluoride, for example, one or more of $YF_3$, $LiF$, $MgF_2$, $NaF$, $LaF_3$, $BaF_2$, $CaF_2$, and $AlF_3$. Further, it is preferable that each of the layers constituting the multilayer film other than the uppermost layer is realized by a silicon-free oxide film (e.g., a MgO film).

Alternatively, it is possible to form a multilayer film on each of the end surfaces 91a and 91b of the ferrules 2a and 2b. FIG. 5B is a cross-sectional side view of a portion of a variation 80 of the optical device according to the fifth embodiment of the present invention. In the optical device 80 illustrated in FIG. 5B, two films 62 and 61 are formed on the end surface 91b of the ferrule 2a in this order. In this case, the degree of adhesiveness between the film 52 of the film 61 is lower than the degree of adhesiveness between the films 51 and 52, the degree of adhesiveness between the films 62 and 61, the degree of adhesiveness between the film 51 and the end surface 91a of the ferrule 2a, and the degree of adhesiveness between the film 62 and the end surface 91b of the ferrule 2b.

Further, it is preferable that the thicknesses of the respective films 51, 52, 62, and 61 satisfy the conditions expressed by the aforementioned equations (1) to (3).

Note that in FIGS. 5A and 5B, the end surfaces of the ferrule 2a and the ferrule 2b at the ends which are inserted into the sleeve 3 are processed to be hemispheric in shape. Alternatively, only one of the two end surfaces may be processed to be hemispheric in shape while the other is ground to be a flat surface, as illustrated in FIG. 3C. As a further alternative, both end surfaces may be ground to be flat surfaces.

What is claimed is:

1. An optical device for laser light comprising:
    a first optical member having a light-exit end at which light exits the first optical member;
    a second optical member having a light-entrance end which abuts said light-exit end through a protective medium and from which said light enters the second optical member; and
    said protective medium is arranged between said light-exit end and said light-entrance end, and suppresses fixing together of the light-exit end and the light-entrance end,
    wherein said protective medium contains fluoride,
    wherein said protective medium is realized by a film formed on only one of the light-exit end and the light-entrance end, and
    wherein said film is a multilayer film constituted by layers including a lowermost layer and an uppermost layer, a first degree of adhesiveness between the uppermost layer and the other of the light-exit end and the light-entrance end is lower than a second degree of adhesiveness between adjacent ones of the layers, and a third degree of adhesiveness between the lowermost layer and said one of the light-exit end and the light-entrance end.

2. An optical device for laser light comprising:
    a first optical member having a light-exit end at which light exits the first optical member;
    a second optical member having a light-entrance end which abuts said light-exit end through a protective medium and from which said light enters the second optical member; and
    said protective medium which is transparent, arranged between said light-exit end and said light-entrance end, and reusable even after the light-exit end and the light-entrance end are pressed together with a pressure of approximately 0.5 kgf and are then separated from each other,
    wherein said protective medium contains fluoride,
    wherein said protective medium is realized by a film formed on only one of the light-exit end and the light-entrance end, and
    wherein said film is a multilayer film constituted by layers including a lowermost layer and an uppermost layer, a first degree of adhesiveness between the uppermost layer and the other of the light-exit end and the light-entrance end is lower than a second degree of adhesiveness between adjacent ones of the layers, and a third degree of adhesiveness between the lowermost layer and said one of the light-exit end and the light-entrance end.

3. An optical device according to claim 2, wherein said pressure is approximately 1 kgf.

4. An optical device according to any one of claims 1 to 3, wherein said protective medium is realized by first and second films respectively formed on the light-exit end and the light-entrance end.

5. An optical device according to claim 4, wherein said first film is a first multilayer film constituted by first layers including a lowermost layer and an uppermost layer, said second film is a second multilayer film constituted by second layers including a lowermost layer and an uppermost layer, a first degree of adhesiveness between the uppermost layer of the first multilayer film and the uppermost layer of the second multilayer film is lower than a second degree of adhesiveness between adjacent ones of the first layers, a third degree of adhesiveness between adjacent ones of the second layers, a fourth degree of adhesiveness between the lowermost layer of the first multilayer film and said light-exit end, and a fifth degree of adhesiveness between the lowermost layer of the second multilayer film and said light-entrance end.

6. An optical device according to claim 5, wherein said first and second films are respectively formed of different materials.

7. An optical device according to claim 5, wherein said uppermost layer of each of said first multilayer film and said second multilayer film contains fluoride.

8. An optical device according to claim 7, wherein said fluoride is silicon-free.

9. An optical device according to claim 8, wherein each of said first layers other than said uppermost layer of the first multilayer film and said second layers other than said uppermost layer of the second multilayer film is realized by a silicon-free oxide film.

10. An optical device according to claim 7, wherein said uppermost layer of each of said first multilayer film and said second multilayer film is formed of one or more of $YF_3$, LiF, $MgF_2$, NaF, $LaF_3$, $BaF_2$, $CaF_2$, and $AlF_3$.

11. An optical device according to claim 10, wherein each of said first layers other than said uppermost layer of the first multilayer film and said second layers other than said uppermost layer of the second multilayer film is realized by a silicon-free oxide film.

12. An optical device according to claim 7, wherein each of said first layers other than said uppermost layer of the first multilayer film and said second layers other than said uppermost layer of the second multilayer film is realized by a silicon-free oxide film.

13. An optical device according to claim 5, wherein each of said first layers other than said uppermost layer of the first multilayer film and said second layers other than said uppermost layer of the second multilayer film is realized by a silicon-free oxide film.

14. An optical device according to claim 4, wherein said first and second films are respectively formed of different materials.

15. An optical device according to any one of claims 1 to 3, wherein said light has a wavelength, said protective medium has a total optical thickness in a propagation direction of the light, and the total optical thickness is equal to an integer multiple of half of the wavelength.

16. An optical device according to any one of claims 1 to 3, wherein said light has a wavelength, said protective medium has a total optical thickness in a propagation direction of the light, and the total optical thickness is less than half of the wavelength.

17. An optical device A laser module according to claim 16, wherein said protective medium realizes propagation of said light from said first optical member to said second optical member with low loss.

18. An optical device according to claim 17, wherein said protective medium is formed of one or more of $YF_3$, LiF, $MgF_2$, NaF, $LaF_3$, $BaF_2$, $CaF_2$, and $AlF_3$.

19. An optical device according to any one of claims 1 to 3, wherein said uppermost layer contains fluoride.

20. An optical device according to claim 19, wherein said fluoride is silicon-free.

21. An optical device according to claim 20, wherein each of said layers other than said uppermost layer is realized by a silicon-free oxide film.

22. An optical device according to claim 19, wherein said uppermost layer is formed of one or more of $YF_3$, LiF, $MgF_2$, NaF, $LaF_3$, $BaF_2$, $CaF_2$, and $AlF_3$.

23. An optical device according to claim 22, wherein each of said layers other than said uppermost layer is realized by a silicon-free oxide film.

24. An optical device according to claim 19, wherein each of said layers other than said uppermost layer is realized by a silicon-free oxide film.

25. An optical device according to any one of claims 1 to 3, wherein each of said layers other than said uppermost layer is realized by a silicon-free oxide film.

26. An optical device according to any one of claims 1 to 3, wherein said light has a wavelength belonging to a short wavelength range.

27. An optical device according to claim 26, wherein said light has a wavelength belonging to a wavelength range of 190 to 530 nm.

28. An optical device according to any one of claims 1 to 3, wherein at least one of said light-exit end and said light-entrance end is UV cleaned.

29. An optical device according to any one of claims 1 to 3, wherein at least one of said first and second optical members is a light guide.

30. An optical device according to claim 1, wherein the laser light has a wavelength of 530 nm or less and optical power of 160 mW or higher.

31. An optical device according to claim 1, wherein one of the first optical member and the second optical member is an optical fiber and the other one of the first optical member and the second optical member is quartz.

32. An optical device according to claim 2, wherein the laser light has a wavelength of 530 nm or less and optical power of 160 mW or higher.

33. An optical device according to claim 2, wherein one of the first optical member and the second optical member is an optical fiber and the other one of the first optical member and the second optical member is quartz.

34. An optical member for laser light comprising:
an end which abuts an external optical member, and at which first light exiting the external optical member enters said optical member or second light exiting from said optical member enters the external optical member; and
a protective medium which is arranged on said end, and suppresses fixing of the end to the external optical member,
wherein said protective medium contains fluoride,
wherein said protective medium is realized by first and second films respectively formed on the light-exit end and the light-entrance end, and
wherein said first film is a first multilayer film constituted by first layers including a lowermost layer and an uppermost layer, said second film is a second multilayer film constituted by second layers including a lowermost layer and an uppermost layer, a first degree of adhesiveness between the uppermost layer of the first multilayer film and the uppermost layer of the second multilayer film is lower than a second degree of adhesiveness between adjacent ones of the first layers, a third degree of adhesiveness between adjacent ones of the second layers, a fourth degree of adhesiveness between the lowermost layer of the first multilayer film and said light-exit end, and a fifth degree of adhesiveness between the lowermost layer of the second multilayer film and said light-entrance end.

35. An optical device comprising:
a first optical member having a light-exit end at which light exits the first optical member;
a second optical member having a light-entrance end which abuts said light-exit end through a protective medium and from which said light enters the second optical member; and
said protective medium is arranged between said light-exit end and said light-entrance end, and suppresses fixing together of the light-exit end and the light-entrance end,
wherein said protective medium is realized by first and second films respectively formed on the light-exit end and the light-entrance end, and
wherein said first and second films are respectively formed of different materials.

36. An optical device for laser light comprising:
a first optical member having a light-exit end at which light exits the first optical member;
a second optical member having a light-entrance end which abuts said light-exit end through a protective medium and from which said light enters the second optical member; and
said protective medium is arranged between said light-exit end and said light-entrance end, and suppresses fixing together of the light-exit end and the light-entrance end,
wherein said protective medium is realized by first and second films respectively formed on the light-exit end and the light-entrance end,
wherein said first film is a first multilayer film constituted by first layers including a lowermost layer and an uppermost layer, said second film is a second multilayer film constituted by second layers including a lowermost layer and an uppermost layer, a first degree of adhesiveness between the uppermost layer of the first multilayer film and the uppermost layer of the second multilayer film is lower than a second degree of adhesiveness between adjacent ones of the first layers, a third degree of adhesiveness between adjacent ones of the second layers, a fourth degree of adhesiveness between the lowermost layer of the first multilayer film and said light-exit end, and a fifth degree of adhesiveness between the lowermost layer of the second multilayer film and said light-entrance end, and
wherein said first and second films are respectively formed of different materials.

37. An optical device comprising:
a first optical member having a light-exit end at which light exits the first optical member;
a second optical member having a light-entrance end which abuts said light-exit end through a protective medium and from which said light enters the second optical member; and
said protective medium which is transparent, arranged between said light-exit end and said light-entrance end, and reusable even after the light-exit end and the light-entrance end are pressed together with a pressure of approximately 0.5 kgf and are then separated from each other,
wherein said protective medium is realized by first and second films respectively formed on the light-exit end and the light-entrance end, and
wherein said first and second films are respectively formed of different materials.

38. An optical device comprising:
a first optical member having a light-exit end at which light exits the first optical member;
a second optical member having a light-entrance end which abuts said light-exit end through a protective medium and from which said light enters the second optical member; and
said protective medium which is transparent, arranged between said light-exit end and said light-entrance end, and reusable even after the light-exit end and the light-entrance end are pressed together with a pressure of approximately 0.5 kgf and are then separated from each other, wherein said protective medium is realized by first and second films respectively formed on the light-exit end and the light-entrance end, wherein said first film is a first multilayer film constituted by first layers including a lowermost layer and an uppermost layer, said second film is a second multilayer film constituted by second layers including a lowermost layer and an uppermost layer, a first degree of adhesiveness between the uppermost layer of the first multilayer film and the uppermost layer of the second multilayer film is lower than a second degree of adhesiveness between adjacent ones of the first layers, a third degree of adhesiveness between adjacent ones of the second layers, a fourth degree of adhesiveness between the lowermost layer of the first multilayer film and said light-exit end, and a fifth degree of adhesiveness between the lowermost layer of the second multilayer film and said light-entrance end, and wherein said first and second films are respectively formed of different materials.

39. An optical device for laser light comprising:

a first optical member having a light-exit end at which light exits the first optical member;

a second optical member having a light-entrance end which abuts said light-exit end through a protective medium and from which said light enters the second optical member; and said protective medium is arranged between said light-exit end and said light-entrance end, and suppresses fixing together of the light-exit end and the light-entrance end, wherein said light has a wavelength belonging to a short wavelength range, and wherein said light has a wavelength belonging to a wavelength range of 190 to 530 nm, wherein said protective medium is realized by a film formed on only one of the light-exit end and the light-entrance end, and wherein said film is a multilayer film constituted by layers including a lowermost layer and an uppermost layer, a first degree of adhesiveness between the uppermost layer and the other of the light-exit end and the light-entrance end is lower than a second degree of adhesiveness between adjacent ones of the layers, and a third degree of adhesiveness between the lowermost layer and said one of the light-exit end and the light-entrance end.

40. An optical device for laser light comprising:

a first optical member having a light-exit end at which light exits the first optical member;

a second optical member having a light-entrance end which abuts said light-exit end through a protective medium and from which said light enters the second optical member; and said protective medium which is transparent, arranged between said light-exit end and said light-entrance end, and reusable even after the light-exit end and the light-entrance end are pressed together with a pressure of approximately 0.5 kgf and are then separated from each other, wherein said light has a wavelength belonging to a short wavelength range, and wherein said light has a wavelength belonging to a wavelength range of 190 to 530 nm, wherein said protective medium is realized by a film formed on only one of the light-exit end and the light-entrance end, and wherein said film is a multilayer film constituted by layers including a lowermost layer and an uppermost layer, a first degree of adhesiveness between the uppermost layer and the other of the light-exit end and the light-entrance end is lower than a second degree of adhesiveness between adjacent ones of the layers, and a third degree of adhesiveness between the lowermost layer and said one of the light-exit end and the light-entrance end.

* * * * *